March 21, 1961 A. M. ZUCKERMAN Re. 24,948

ROTARY WEB PRINTING MACHINE

Original Filed Sept. 23, 1955 4 Sheets-Sheet 1

INVENTOR
ADOLPH M. ZUCKERMAN.
BY
ATTORNEYS

ROTARY WEB PRINTING MACHINE

Original Filed Sept. 23, 1955 4 Sheets-Sheet 2

INVENTOR
ADOLPH M. ZUCKERMAN.
BY
Mayer & Pennie
ATTORNEYS

ROTARY WEB PRINTING MACHINE

Original Filed Sept. 23, 1955 4 Sheets-Sheet 3

INVENTOR
ADOLPH M. ZUCKERMAN.
BY
ATTORNEYS

March 21, 1961 A. M. ZUCKERMAN Re. 24,948

ROTARY WEB PRINTING MACHINE

Original Filed Sept. 23, 1955 4 Sheets-Sheet 4

INVENTOR
ADOLPH M. ZUCKERMAN.

BY

ATTORNEYS

United States Patent Office

Re. 24,948
Reissued Mar. 21, 1961

24,948

ROTARY WEB PRINTING MACHINE

Adolph M. Zuckerman, New York, N.Y., assignor to R. Hoe & Co., Inc., New York, N.Y., a corporation of New York Original No. 2,887,312, dated May 19, 1959, Ser. No. 536,175, Sept. 23, 1955. Application for reissue Feb. 3, 1960, Ser. No. 6,580

11 Claims. (Cl. 270—5)

Matter enclosed in heavy brackets [ ] appears in the original patent but forms no part of this reissue specification; matter printed in italics indicates the additions made by reissue.

This invention relates to printing machines, and more particularly to such machines having provision for utilizing printing elements for printing alternatively on the same or opposite sides of a web, so as to permit the production of a variety of products.

[More particularly, the invention is concerned with relief printing as opposed to intaglio or planographic printing. In relief printing in multicolor, a major problem] *More particularly, the invention is concerned with relief printing, as opposed to intaglio printing, and with planographic printing. In relief and planographic printing in multicolor, a major problem* is the drying of the ink during the passage of the web from one impression cylinder and its cooperating plate cylinder or plate cylinders to the next impression cylinder. This problem can be solved in a very satisfactory manner by grouping all the plate cylinders which print on the same side of a web around a common impression cylinder, since the web in passing from one printing point to the next will not have undried ink brought into contact with rollers, bars or other guide elements. After being printed on one side the web is led through suitable drying equipment to dry the ink, and is then led about a second impression cylinder that co-acts with an additional number of plate cylinders to print the other side of the web and it is again dried by passing it through a second drying equipment whence it passes to a folder which cuts and delivers the products.

Machines of this kind usually have five or more plate cylinders grouped around each impression cylinder, and they are somewhat lacking in flexibility, in that the plate cylinders associated with a given impression cylinder cannot be used for printing on different webs or on opposite sides of the same web. Thus, a pair of five color printing units of this type possesses essentially only the capability of printing a web with any number of colors up to five on each side and is not adapted to the printing of a plurality of webs.

The object of the present invention is to provide an improved printing machine forming a combination of web printing units, dryers and folders, which are interrelated in such a manner as to obtain great flexibility in product produced, with practical web leads in all cases and without requiring reversal of direction of rotation of any of the printing cylinders.

The machine of the invention may comprise a pair of web supplies, a pair of five color printing machines and a pair of folders arranged together in such a manner that the ten plate cylinders may print up to five colors on each side of a full width single web, which may then be delivered in any of a variety of usual manners, producing from cylinders of typical size, thirty-two magazine pages as a single product for each rotation of the impression cylinders, or alternatively two sixteen page sections or four eight page sections. The same equipment may be utilized for printing on two webs, by dividing it into two presses, each having a web supply and folder and printing up to two colors on one side of the webs and three colors on the other; in which case, a maximum of sixty-four pages delivered in various manners may be had. The same equipment may also be utilized for printing a full width web with up to two colors on one side and three on the other, together with a half-width web printed with five colors on both sides, in which case a maximum production of forty-eight pages is possible.

The machine embodying the invention in a preferred form will now be described with reference to the accompanying drawing and the features forming the invention will then be pointed out in the appended claims.

Figure 1A:
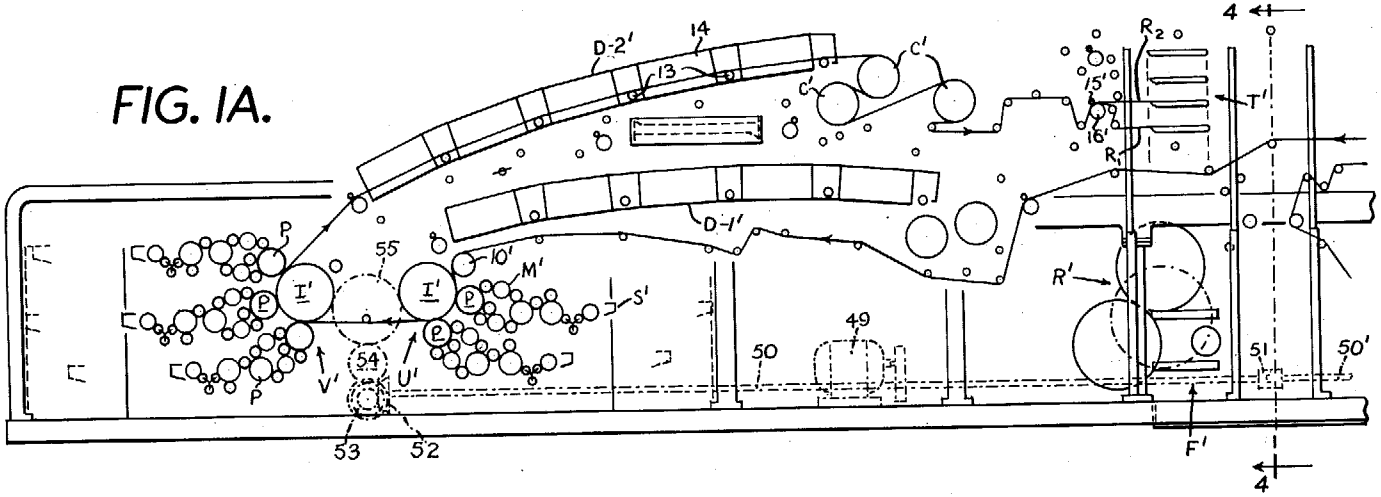
Figs. 1A and 1B are schematic side elevations of a printing machine showing a web lead for printing a web in up to five colors on both sides and delivering the same as two sixteen page magazine sections.
Figure 1B:
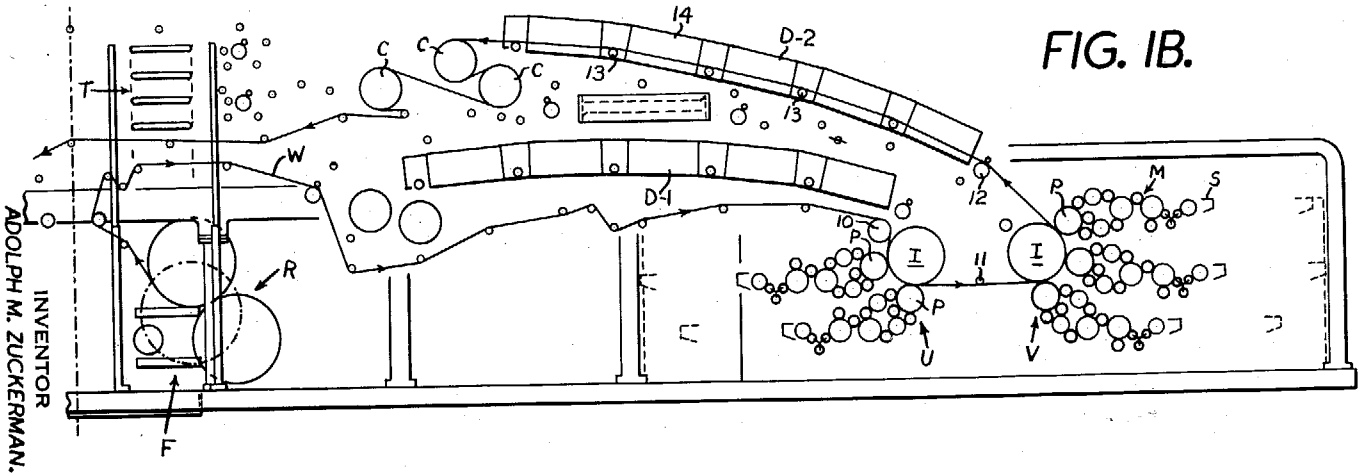

Referring now to Fig. 1A it will be understood that it shows the left end of the machine, and Fig. 1B shows the right end, which is a duplicate or mirror-image of the left end. Corresponding parts in the two ends of the machine are identified by similar reference characters but with the addition of a prime (′) superscript to those in the left hand end of the machine, so that the description of one end serves equally well for the other.

Figure 4:
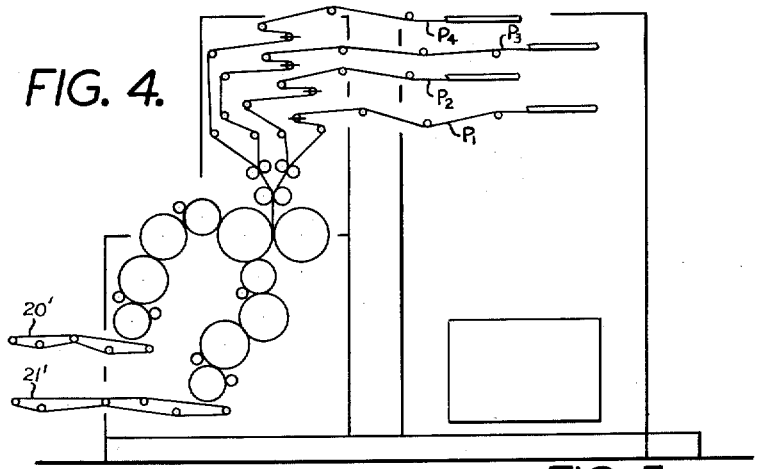
Fig. 4 is a schematic elevation looking in the direction of the arrows 4—4 of Fig. 1A.

The web roll holding and roll changing equipment takes the form of a pair of reels R and R′, centrally located and surmounted by turner bar arrangements T and T′, for directing the printed webs at right angles out of the general line of the machine to folders F and F′, indicated symbolically in Figs. 1A and 1B and shown schematically as the folder F in Fig. 4. Printing units U, V and U′, V′ are provided, each comprising an impression cylinder I or I′ and associated plate cylinders P or P′, the units U, U′ having two plate cylinders and the units V, V′ having three such plate cylinders. There is associated with each plate cylinder, as indicated, an ink motion M or M′ containing the usual train of drums and rollers for taking ink from an ink supply or fountain S or S′ and progressively working it into a uniform film for inking the associated plate cylinders. Dryers D1 and D2 are provided on the right end of the machine and similar dryers D1′ and D2′ at the left end, together with suitable cooling rolls C and C′, which also perform web forwarding functions. A bay window web turning arrangement B or B′ is also provided for each end of the machine, together with various guide rollers as shown.

The detailed structures of most of the elements involved in the machine form no part of the present invention and will be obvious to anyone skilled in the art, Such details as are of importance to a full understanding of the invention will be brought out at proper points in the following description of web leads and operation.

The first web lead of interest is that shown in Figs. 1A and 1B. It involves printing on a web W supplied by the reel R in up to five colors by units U and V on one side of the web and then in up to five colors on the opposite side of the web by the units U′ and V′. Units U and V rotate counterclockwise and preferably are not reversible, while units U′ and V′ rotate clockwise, and also are preferably not reversible. The web in passing from the reel R travels a rather long course, since the first unit U is spaced a considerable distance from the reed R, so as to make room for the dryer D1. A forwarding roller 10, located immediately ahead of the impression cylinder of unit U, grips the paper by suction, thus providing accurate control of the web feed and preventing wrinkling or other distortion or displacement due to the length of travel of the web in its passage from reel to printing unit and also permitting accurate tension control and avoiding the building up of excess tension in certain cases due to the need for pulling the web through equipment beyond the units U and V. In its passage from unit U to unit V, the web will touch only a single guide roller 11, which contacts the unprinted side of the web and there is thus no tendency towards smudging or setting off of ink, nor is there any need for drying equipment between the units U and V, when used in this manner for printing on the same side of a web. After leaving unit V, the web W, which is now printed with up to five colors on one side, passes over roller 12 through the dryer D2 which is provided with guide rollers 13, a housing or ducting 14, and any desired heating or blowing and ventilating equipment. From this dryer the web passes around cooling rollers C, as shown, and is led over guide rollers, as indicated, under the banks of turner bars T and T′ and over the reels R and R′ and under dryer D1′ to the units U′ and V′, where it is printed on its reverse side in precisely the same manner as just described in connection with the printing by units U and V. By reason of the necessarily long web travel which is involved, the suction feeding roller 10′ is of even greater importance at this point. The completely printed web now passes through dryer D2′ and over the indicated cooling rollers C′ to the folder F′, being slit by a slitter 15′ as it passes over roller 16′, so as to divide it into ribbons R1 and R2, which are turned at right angles around the turning bars indicated. These ribbons are then associated, as indicated in Fig. 4, and pass to the cutoff, folding and delivery mechanism, ultimately being deposited on either or both of the delivery tapes 20′, 21′. It will be understood that the treatment of the web may involve any desired collecting and folding operations, which operations form in themselves no part of the present invention.

Figure 2A:
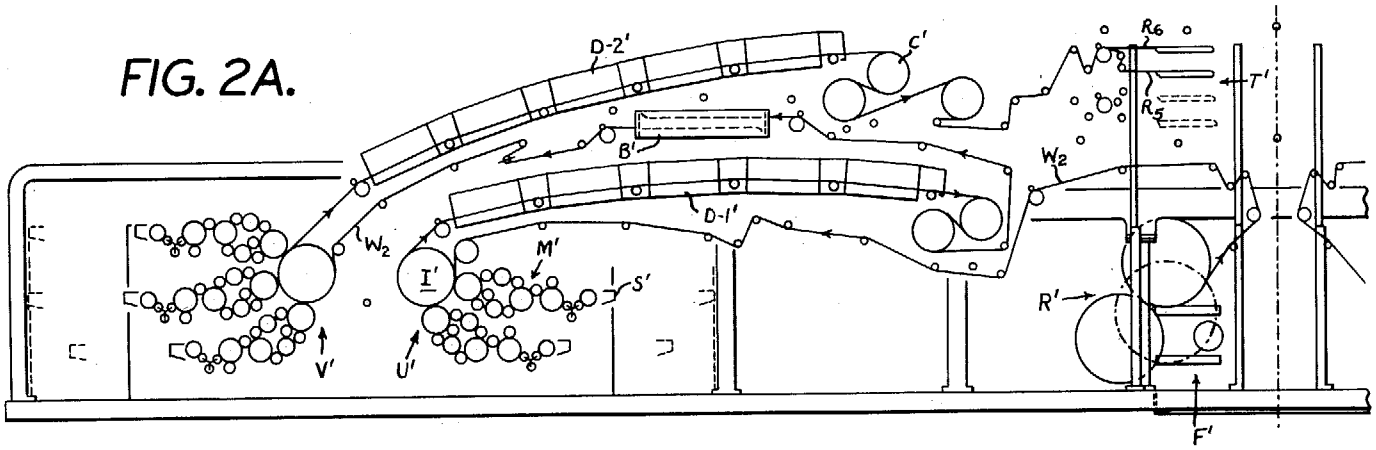
Figs. 2A and 2B are similar schematic elevations, showing the same equipment arranged for printing in up to two colors on one side and three colors on the other side of two webs, and showing the products being delivered as four sixteen page magazine sections.
Figure 2B:
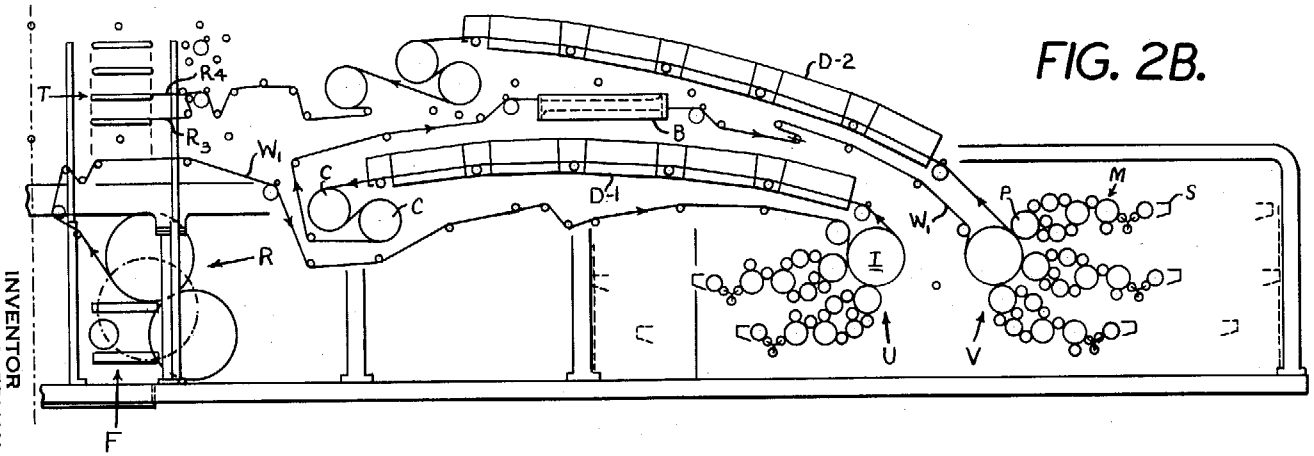

Figs. 2A and 2B illustrate a second mode of operation of the equipment, printing on two full width webs W1 and W2, the operation up to the point where the printing is completed being identical in the two cases, so that a description of the printing of the web W1 will serve also for the web W2.

Figure 5:
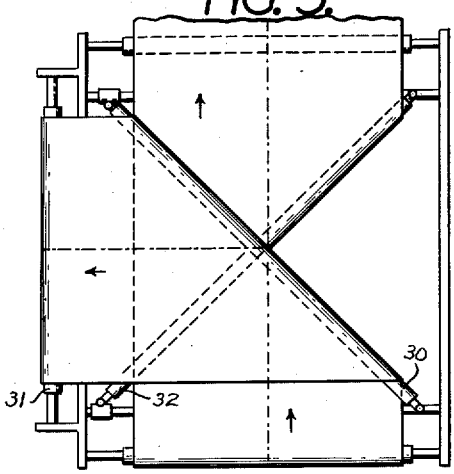
Fig. 5 is a schematic plan view of a bay window or web turn-over device forming part of the machine.

Web W1 as shown in Fig. 2B is supplied from reel R and is guided in the indicated path under the dryer D1 to unit U, where it is printed in one or two colors on one side. It then travels back through the dryer D1 around associated cooling rollers C and back between the dryers D1 and D2 to the second printing unit V for printing the other side. In its passage, however, it goes through the bay window arrangement B (Fig. 5), being deflected at right angles around turning bar 30, passing around a roller 31 and then around a second turning bar 32, so as to be back in the original alignment and direction of travel but upside down, and so that passage through unit V in the same direction of rotation (counterclockwise) prints the opposite side of the web in any desired number of colors from one to three. The thus printed web W1 is shown as being slit into two ribbons R3 and R4 directed out at right angles by turner bars, as indicated, to the folder F. The similarly printed web W2 as shown in Fig. 2A is slit and guided over turner bars to the folder F′, as indicated. Web W2 is divided into ribbons R5 and R6. In this lead, the two webs are delivered separately and the machine functions for producing up to sixty-four magazine pages in various desired combinations according to the arrangement of the folders F and F′. Obviously the web W1 could be led into the folder F′ in which case the product of the two ends of the machine would be combined and delivered together if desired.

Figure 3A:
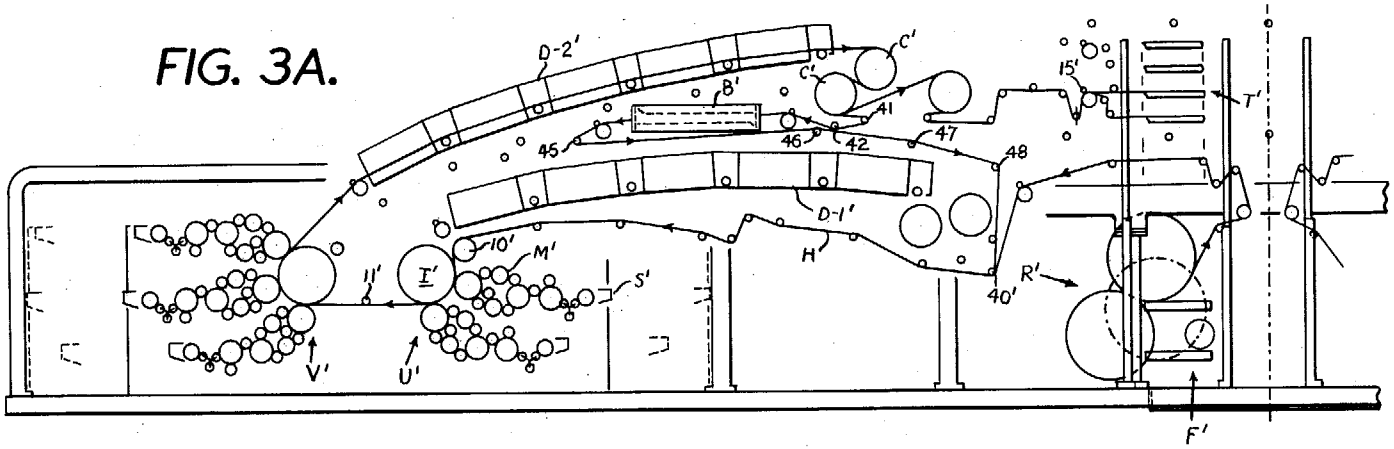
Fig. 3A is a similar view, showing the printing of a half width web with up to five colors on each side and 3B shows a full width web printed in up to two colors on one side, and up to three colors on the other, the products being delivered as two sixteen page sections and two eight page sections.

Fig. 3A shows an alternative method of operation, in which a half width web is printed in up to five colors on both sides. The course of the half width web H is from the reel R′, over the guide rollers indicated, including rollers 40′ and 10′, through the printing units U′ and V′, dryer D2′, around the cooling rollers C′, as indicated, then over guide rollers 41 and 42 into the bay window B′.

Figure 6:
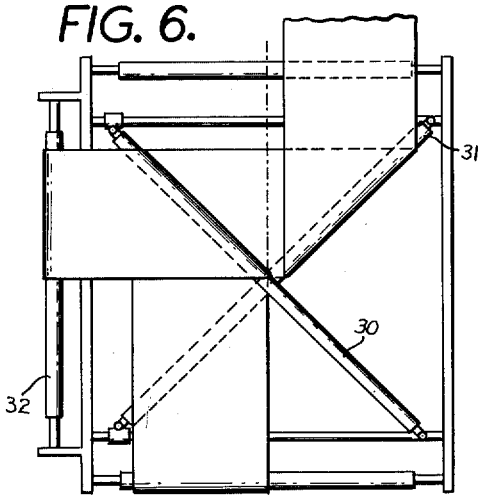
Fig. 6 is a view similar to Fig. 5 but showing the reversal and lateral shifting of a half width web.

In bay window B′, the half width web H passes over turner bar 30, roller 31 and turner bar 32 (Fig. 6), which elements displace the half width web laterally by its width plus a small clearance in addition to turning it over. It will be understood that Figs. 5 and 6 both show the same turner bar arrangement, and that the path of a web after it leaves the bay window is offset only when a half width or narrower web is used.

Upon leaving the bay window arrangement B′, the half width web H passes over the various guide rolls, including rolls 45, 46, 47 and 48, and it then passes around guide roll 40′, following the same course from this point onward through the printing units U′ and V′ as when previously led through these units, but positioned alongside itself and upside down, so as to be printed on the second side. After this printing, the now completely printed web H goes through dryer D2′, around the cooling rollers C′ and to the folder F′, being shown as slit by slitter 15′ to form two ribbons and which may be associated with other ribbons printed by units U and V in any desired manner.

Figure 3B:
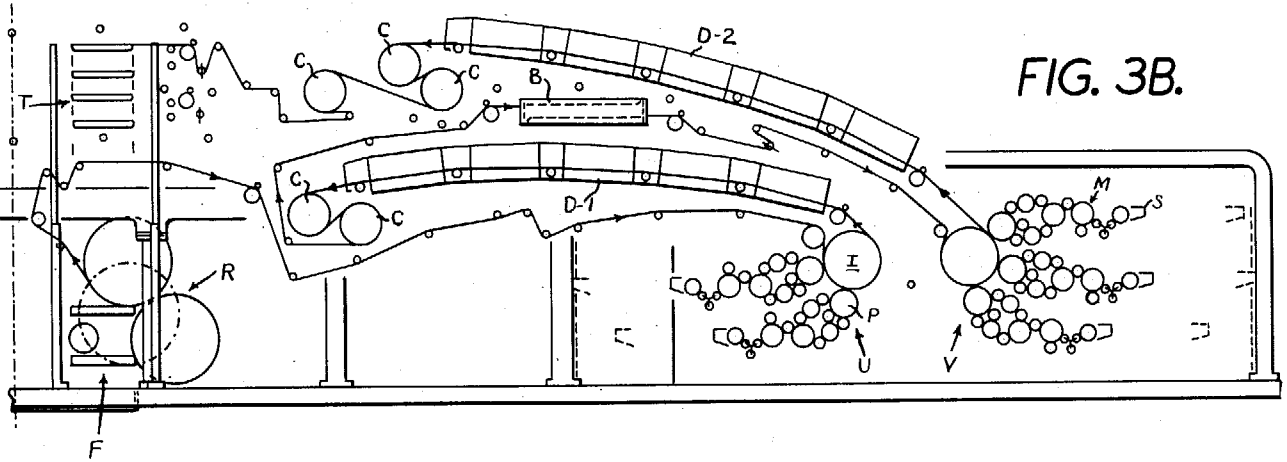
Figure 7:
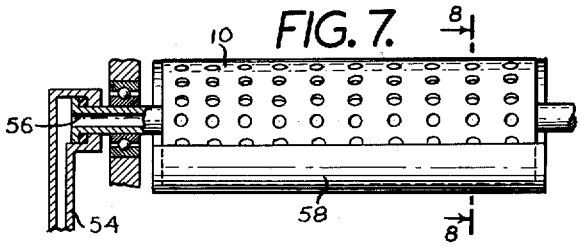
Fig. 7 is an elevation view of a web forwarding roller forming part of the machine.
Figure 8:
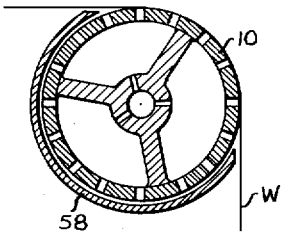
Fig. 8 is a section on line 8—8 of Fig. 7.

The web lead shown in Fig. 3B is very similar to the lead shown in Fig. 2B, but the Fig. 3B web is slit by an upper slitter and carried to upper turner bars adjacent the folder F. The product may then be associated with that produced by the web lead shown in Fig. 3A if desired. Figs. 7 and 8 depict the suction forwarding rollers 10 and 10′ which are driven, and act on the web to propel it and avoid imposing an excessive strain that would otherwise occur where a considerable length of web is being drawn through the machine by the printing cylinders. As shown, the periphery of the roller is perforated, the supporting shaft 56 is hollow and a suitable duct 57 leading from the bearings permits a partial vacuum to be maintained and thereby holds the web against the roller with sufficient force to propel it. A shield 58 covers the greater part of the surface of the roller that is not covered by the web.

A preferred means for driving a machine made in accordance with the invention is indicated in dot and dash lines in Fig. 1A and comprises a motor 49 connected to a main line shaft 50 extending from a point midway below the printing units U′ and V′ to a point midway between the folder F′ and the corresponding folder F shown in Fig. 1B. A coupling 51 is provided at this point to connect the shaft 50 with a corresponding shaft 50′ driven by a similar motor not shown.

The shaft 50 is preferably connected by bevel or hypoid gearing 52 to a horizontal shaft carrying a gear 53 meshing with an idler 54 that meshes with a large synchronizing gear 55 which meshes with a gear on the impression cylinder I′ of each of the printing units U′ and V′. Similar gearing is used on the opposite end of the machine for driving the units U and V. The plate cylinders carry gears meshing closely with the large gears on the impression cylinders.

The synchronizing gear 55 and the impression cylinder gears are relatively large and as they rotate in fixed bearings, the gears can be and are so closely fitted there is no appreciable backlash or lost motion between the impression cylinder of printing unit U′ and the impression cylinder of unit V′. With this arrangement of gearing, the press arrangement herein shown will print with an accuracy of register approached only by a magazine press having two very large diameter impression cylinders and five or more plate cylinders surrounding each of them.

It would be necessary to use an entire machine of such type to print two colors on each side of a full width web, but the same work could be done on one half of the machine shown in the drawings, leaving the other half available for other work.

In many multicolor printing machines it is common practice to provide means for reversing the rotation of the cylinders, in order to use desired web leads. Some advantage is thus gained, but it is at a sacrifice of accuracy of register, because reversing gear mechanisms necessarily have members that slide on one another when reversing. These members cannot be tight enough to eliminate backlash. The press made in accordance with the arrangement and web leads here disclosed can produce accurately registered printing of a wide range of products.

What is claimed is:

1. A multicolor web printing machine comprising a line of printing units including, in order, first and second printing units, web supply mechanism, and third and fourth printing units, together with turner bars above the web supply mechanism for directing printed webs transversely out of the said line of units and folder, cut off and delivery mechanism positioned opposite the turner bars adjacent the web supply mechanism, for forming the printed webs into products, a first dryer positioned between the web supply mechanism and the said second printing unit, web reversing mechanism above the said first dryer, and a second dryer positioned above the said web reversing mechanism and between the said first printing unit and the said turner bars, and means for guiding a web from the web supply mechanism to the turner bars through alternative paths including a first path going through the second unit, the first dryer, the web reversing mechanism, the first unit and second dryer, in order, for printing the web on both sides and thence to the turner bars and a second path going, in order, through the second unit, first unit and second dryer for printing by means of the said two units on a single side of the web.

2. A multicolor web printing machine according to claim 1, comprising also dryers and a reversing mechanism associated with the said third fourth printing units for printing the web on alternative paths the same as specified in the case of the said first and second units.

3. A multicolor web printing machine according to claim 1, comprising also means for guiding the web across the web supply mechanism following printing by the said second unit for further printing thereon by the said third unit.

4. A multicolor web printing machine according to claim 3, in which the means for guiding the web across the web supply mechanism comprises guide rollers positioned below the turner bars and above the said web supply mechanism.

5. A multicolor web printing machine comprising a line of printing units including first and second units, each having an impression cylinder and a plurality of plate cylinders cooperating therewith, gearing driving both said units in the same direction, means for guiding a web through the said units for printing on the same side thereof in both units, web reversing mechanism to turn the web printed by one of the said units upside down for printing by the second said unit by running in the same direction on the opposite side thereof, web supply and web delivery means positioned at one end of the said two units, and a vacuum feeding cylinder associated with the nearer of the two units for gripping and feeding a web to the said unit.

6. A multicolor web printing machine according to claim 5, comprising also a further printing unit positioned in line with the said first and second units and at the opposite end of the said web supply mechanism so that the machine comprises a line consisting, in order, of the said further printing mechanism, the web supply mechanism and the first mentioned two units and means for guiding a web from the web supply mechanism through the said further printing mechanism, back over the web supply mechanism to the said feeding cylinder and through the first mentioned two units to the web delivery means.

7. A multicolor web printing machine in combination comprising two machines each such machine comprising first and second printing units, each having an impression cylinder and a plurality of plate cylinders cooperating therewith, means for guiding a web through the said units for printing on the same side thereof in both units, web reversing mechanism to turn the web printed by the first said unit upside down for printing by the second said unit on the opposite side thereof by running in the same direction, irreversible drive gearing for driving the two said units together in the same direction and comprising a toothed impression cylinder gear fixed to its impression cylinder for driving each unit and further toothed gearing in mesh with the two said gears and positively coupling the two said gears together, the said combination including also a web supply between the said two machines and the said two machines being positioned symmetrically with respect to the said web supply between the same, and comprising also means for leading a web from the said web supply through all units of both machines and means for leading a pair of webs from said web supply for printing on the two sides of each web by means of one unit of each of the two said machines, and a common drive shaft for driving both said machines through the said further toothed gearing of the two said machines.

8. A printing machine according to claim 7, in which the said drive shaft is coupled to the said further toothed gearing by irreversible fixed intermediate toothed gearing.

9. A multicolor web printing machine comprising two machines positioned symmetrically with respect to a web supply between the same; each such machine comprising first and second printing units, each having an impression cylinder and a plurality of plate cylinders cooperating therewith, means for guiding a web through the said units for printing on the same side thereof in both units, web reversing mechanism to turn the web printed by the first said unit upside down for printing by the second said unit on the opposite side thereof by running in the same direction, and irreversible drive gearing for driving the two said units together and comprising a toothed impression cylinder gear fixed to its impression cylinder for driving each unit and an intermediate gear in mesh with the two said gears and positively coupling the two said gears together; and comprising also means for leading a web from the said web supply through all units of both machines and means for leading a pair of webs from said web supply for printing on the two sides of each web by means of one unit of each of the two said machines, and a common drive shaft for driving both said machines through the said intermediate gear of the two said machines.

10. A printing machine according to claim 9, in which the said drive shaft is coupled to the said intermediate gear by irreversible fixed intermediate toothed gearing.

*11. A multicolor web printing machine comprising a line of printing units including, in order, first and second printing units, web supply mechanism, and third and fourth printing units, together with turner bars above the web supply mechanism for directing printed webs transversely out of the said line of units and folder, cut off and delivery mechanism positioned opposite the turner bars*

*adjacent the web supply mechanism, for forming the printed webs into products, a first dryer positioned between the web supply mechanism and the said second printing unit, web reversing mechanism positioned for receiving a web from the said first dryer, and a second dryer positioned above the said first dryer and between the said first printing unit and the said turner bars, and means for guiding a web from the web supply mechanism to the turner bars through alternative paths including a first path going through the second unit, the first dryer, the web reversing mechanism, the first unit and second dryer, in order, for printing the web on both sides and thence to the turner bars and a second path going, in order, through the second unit, first unit and second dryer*

*for printing by means of the said two units on a single side of the web.*

References Cited in the file of this patent or the original patent

UNITED STATES PATENTS

| | | |
|---|---|---|
| 402,561 | Carpenter | May 7, 1889 |
| 508,918 | Crowell | Nov. 21, 1893 |
| 636,862 | Spalckhaver | Nov. 14, 1899 |
| 752,940 | Wood | Feb. 23, 1904 |
| 771,644 | Kempf | Oct. 4, 1904 |
| 836,669 | Crowell | Nov. 27, 1906 |
| 1,580,635 | Barber | Apr. 13, 1926 |
| 2,088,681 | Zuckerman | Aug. 3, 1937 |

FOREIGN PATENTS

| | | |
|---|---|---|
| 580,906 | Great Britain | Sept. 24, 1946 |